(12) United States Patent
Plumhoff

(10) Patent No.: US 7,625,824 B2
(45) Date of Patent: Dec. 1, 2009

(54) PROCESS CHANGE DETECTION THROUGH THE USE OF EVOLUTIONARY ALGORITHMS

(75) Inventor: Jason Plumhoff, Largo, FL (US)

(73) Assignee: Oerlikon USA, Inc., St. Petersburg, FL (US)

( * ) Notice: Subject to any disclaimer, the term of this patent is extended or adjusted under 35 U.S.C. 154(b) by 251 days.

(21) Appl. No.: 11/441,811

(22) Filed: May 26, 2006

(65) Prior Publication Data

US 2006/0287753 A1 Dec. 21, 2006

Related U.S. Application Data

(60) Provisional application No. 60/690,941, filed on Jun. 16, 2005.

(51) Int. Cl.
*H01L 21/302* (2006.01)

(52) U.S. Cl. .............................. 438/714; 438/5; 438/9; 438/710; 216/59

(58) Field of Classification Search .............. 438/706, 438/710, 712, 714, 720, 5, 9; 216/59, 67, 216/58
See application file for complete search history.

(56) References Cited

U.S. PATENT DOCUMENTS

| | | | |
|---|---|---|---|
| 4,263,088 A | 4/1981 | Gorin | |
| 4,491,499 A | 1/1985 | Jerde et al. | |
| 4,935,877 A | 6/1990 | Koza | |
| 5,288,367 A | 2/1994 | Angell | |
| 5,467,883 A | 11/1995 | Frye et al. | |
| 5,653,894 A | 8/1997 | Ibbotson et al. | |
| 5,737,496 A | 4/1998 | Frye et al. | |
| 5,841,651 A | 11/1998 | Fu | |
| 5,864,633 A | 1/1999 | Ospal et al. | |
| 5,953,446 A | 9/1999 | Ospal et al. | |
| 6,101,971 A | 8/2000 | Denholm et al. | |
| 6,363,294 B1 | 3/2002 | Coronel et al. | |
| 6,472,238 B1 | 10/2002 | Wen | |
| 6,532,076 B1 | 3/2003 | Sidorowich | |
| 6,678,572 B1 | 1/2004 | Oh | |
| 6,781,706 B2 | 8/2004 | Sidorowich | |
| 6,859,796 B1 | 2/2005 | Seward | |
| 6,919,279 B1 * | 7/2005 | Rulkens et al. ............. 438/706 |

(Continued)

FOREIGN PATENT DOCUMENTS

EP 0932194 A1 * 7/1999

OTHER PUBLICATIONS

A. Rietman, et al., A Genetic Algorithm for Low Variance Control in Semi . . . IEEE Transactions in Semiconductor Manufacturing, May 1996, pp, 223-229, vol. 9, No. 2.

(Continued)

*Primary Examiner*—Lan Vinh
(74) *Attorney, Agent, or Firm*—Harvey Kauget

(57) ABSTRACT

The present invention provides a method for creating a process change detection algorithm. An evolutionary computing technique is applied to at least one process dataset containing at least one known process change. The evolutionary computing technique will generate a process state function (or a scaling coefficient set for use with an existing process state function) that optimizes detection of the known process changes. The generated process state function or coefficients can then be applied thereafter to future datasets (either in real-time or after processing) to detect process changes.

16 Claims, 15 Drawing Sheets

U.S. PATENT DOCUMENTS

| | | | |
|---|---|---|---|
| 7,101,805 B2* | 9/2006 | Johnson et al. | 438/706 |
| 2001/0010255 A1* | 8/2001 | Kijima | 156/345 |
| 2003/0062339 A1 | 4/2003 | Houge et al. | |
| 2004/0172202 A1 | 9/2004 | Sidorowich | |

OTHER PUBLICATIONS

S. Han et al., Using Neural Network Process Models to Perform PECVD . . . IEEE Transactions on Semiconductor Manufacturing, May 1997 pp. 279-287, vol. 10, No. 2.

K. Xu, et al., A Scalable Parallel Genetic Algorithm For X-Ray . . . Proceedings of the 2005 Conference on Genetic and Evolutionary Computation, Jun. 2005, pp. 811-816.

S. Limanond, et al., Production Data Based Optimal Etch Time Control Design . . . , IEEE Transactions on Semiconductor Manufacturing, Feb. 1999, pp. 139-147 vol. 12, No. 1.

* cited by examiner

Generic Process State Detector

Genetic Algorithm Flowchart

OES Dataset – Process Endpoint Known to Occur at 200s

Note: Data consists of ~300 spectra taken at 1 second intervals

Population of Scaling Coefficient Sets

Figure 6: Scaled Data

Calculating Signal to Noise Ratio (SNR)

Signal = Absolute Value(Mean(A) − Mean(B))

Noise = Mean(Standard Deviation(A) + Standard Deviation(B))

SNR = Signal / Noise

Ranking of Coefficient Sets by SNR

Selection and Rejection of Coefficient Sets

Figure 11: Assignment of Recombination Probability

| Coefficient Sets | Fitness Score | Recombination Probability |
|---|---|---|
| | 23 | 23 / 95 = 24.2% |
| | 20 | 20 / 95 = 21.1% |
| | 14 | 14 / 95 = 14.7% |
| | 12 | 12 / 95 = 12.6% |
| | 8 | 8 / 95 = 8.4% |
| | 7 | 7 / 95 = 7.4% |
| | 6 | 6 / 95 = 6.3% |
| | 5 | 5 / 95 = 5.2% |
| Total = | 95 | 100% |

Recombination Process for Parents A & B

Example of Genetic Optimization

Population fitness improves with each loop iteration

Impact of Optimized Process State Function

Signal to Noise Ratio has been dramatically improved using optimized scaling coefficients.

Optimized Coefficients Applied to Other Datasets

Data indicates that the optimized solution is not specific to the data set used for fitness evaluation in genetic algorithm

PROCESS CHANGE DETECTION THROUGH THE USE OF EVOLUTIONARY ALGORITHMS

CROSS REFERENCES TO RELATED APPLICATIONS

This application claims priority from and is related to commonly owned U.S. Provisional Patent Application Ser. No. 60/690,941 filed Jun. 16, 2005, entitled: Process Change Detection Through the Use of Evolutionary Algorithms, this Provisional Patent Application incorporated by reference herein.

FIELD OF THE INVENTION

This invention relates to a method for detecting a process change in a plasma system. More particularly, the present invention relates to the use of an evolutionary computing technique to generate a process state function or set of scaling coefficients for a plasma etch endpoint system.

BACKGROUND OF THE INVENTION

In any industrial process, it is necessary to monitor process data channels in order to detect any changes that might affect the final product. As the complexity of the process increases, the number of data channels that must be monitored also increases. In extremely complex processes, hundreds of data channels must be analyzed to determine the state of the process.

Although sometimes a matrix notation is used, in general a process state could be described as a function:

$$\text{Process State} = f(a_1 M_1, a_2 M_2, a_3 M_3, \ldots, a_n M_n)$$

where each variable $M_n$ represents a specific process data channel and each $a_n$ represents a scaling coefficient. The scaling coefficients are selected to modify process data channels in such a way as to optimize the results of the function for detection of process changes.

Evaluating a function (or functions) whose variables are process data channels is one method for analyzing multiple data channels and producing an output that describes the process state. This output can then be used for process change detection. FIG. 1 represents a generic process change detection system described in terms of a process state function. Data is collected by at least one detector and sent to an analysis unit. In the analysis unit, the data channels are combined with the scaling factors and entered into the process state function which is then evaluated. The output of this function is then available for the detection of process changes.

An illustrative example of process change detection can be found in the semiconductor industry. One of the steps employed in manufacturing semiconductor devices is plasma etch. In plasma etch processes, a sample is exposed to a plasma designed to etch away specific materials from the sample surface. Often it is necessary to stop the plasma etch at a specific time to achieve a precise etch depth. The time at which the plasma etch should be stopped is called the process endpoint. Determination of process endpoint is often done using a multi-channel technique called optical emission spectroscopy (OES). FIG. 2 describes a typical OES endpoint detection system.

During a plasma etch, the plasma emits electromagnetic energy in a wide range of wavelengths. The exact spectrum emitted by the plasma is dependent in part on the presence of volatile byproducts created during the etching of the sample. In a typical OES endpoint system, a spectrometer is used to separate the plasma emission into discrete wavelengths. The intensity of the emission at each wavelength is measured and becomes a separate process data channel which can be monitored over the course of the etch. By monitoring those data channels that show a repeatable variation during the etch, it is possible to determine when the sample has been completely etched.

In its simplest implementation, an OES system can be used to monitor a single data channel. Gorin et al. (U.S. Pat. No. 4,263,088) disclose a means of determining endpoint in a polysilicon etch using a photoconductive cell optimized to detect plasma emissions at 520 nm. By monitoring the voltage produced by this cell during the etch, it is possible to detect the change in plasma composition that occurs when the polysilicon film is completely etched. In terms of a process state function, this method can be represented by:

$$\text{Process State} = M_{520nm}$$

The limitation of this approach is that a single data channel often does not generate a signal sufficiently above the system noise level to allow for reliable endpoint detection.

Other investigators have noted that endpoint detection sensitivity can be increased by using multiple data channels. Jerde et al. (U.S. Pat. No. 4,491,499) disclose measuring a narrow band of the emission spectrum while simultaneously measuring the intensity of a wider background band centered about the narrow band. In this manner the background data channels can be subtracted from the endpoint signal channels resulting in an improved endpoint signal to noise ratio.

However, the function describing the process state becomes slightly more complicated with the inclusion of multiple data channels as follows:

$$\text{Process State} = (M_{Signal\ 1} + M_{Signal\ 2} + \ldots + M_{Signal\ n}) - (M_{Background\ 1} + M_{Background\ 2} + \ldots + M_{Background\ n})$$

The fundamental limitation to the method described by Jerde et al. is that decisions regarding the selection of appropriate process data channels and the associated scaling factors have to be made based on the user's knowledge of the process. As a result, it becomes prohibitively time consuming for any one user to gain the necessary expertise to select appropriate data channels and scaling factors for all possible plasma etch applications. It is unlikely that any process state function produced through manual selection of data channels and scaling factors will be well optimized to detect a given process change. To ease this burden, several multivariate analysis techniques have been proposed.

Angell et al. (U.S. Pat. No. 5,288,367) disclose using principal component analysis (PCA) to automatically select data channels. This well known multivariate analysis technique groups correlated data channels into linear combinations that describe orthogonal components of variance in the analyzed data. By identifying the component that describes the variance associated with the process endpoint and examining the data channel constituents of that component, one can determine which channels are advantageous to monitor for detecting endpoint. The Angell et al. method process state function can be represented:

$$\text{Process State} = f(p_1 M_1, p_2 M_2, p_3 M_3, \ldots, p_n M_n)$$

where the $p_n$ are given by the loadings of one of the user selected principal components.

The limitation to PCA-based approaches is that the PCA algorithm attempts to describe the variance as a set of orthogonal components. PCA does not attempt to directly optimize the selection of process data channels and scaling factors for process change detection. One hopes that one of the orthogonal components completely captures the endpoint information, but PCA is not specifically directed at this outcome. The signal to noise ratio of the process state function may therefore not be sufficient for some applications.

It should be noted that while the examples presented here are specific to endpoint detection in a plasma etch process, the techniques used are representative of those employed in a wide variety of process monitoring applications. Any process whose state can be described in terms of a function of a data channel or multiple channels can be monitored with similar techniques.

Therefore, there is a need for improving the optimization of process state functions of a plasma etch process.

Nothing in the prior art provides the benefits attendant with the present invention.

Therefore, it is an object of the present invention to provide an improvement which overcomes the inadequacies of the prior art devices and which is a significant contribution to the advancement of the semiconductor processing art.

Another object of the present invention is to provide a method for detecting a process change, the method comprising placing a substrate in a chamber; exposing the substrate to a process with at least one known process change; acquiring at least one dataset during a process; and applying an evolutionary computing technique to at least one dataset to generate a process change detection algorithm.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises an improved method for optimizing at least one process state function during the plasma etching of a substrate.

A feature of the present invention is to provide a method for detecting a process change, the method comprising placing a substrate in a vacuum chamber of a plasma etch system. The substrate can be an insulating material such as a photomask, a semiconductor material, or an electrically conductive material. The substrate is exposed to a plasma within the vacuum chamber of the plasma etch system. During the process, measurements of the plasma condition, substrate condition, and processing apparatus condition are recorded, as is the time at which each measurement was taken. Each kind of measurement represents an individual data channel. The data channels are combined into a dataset. An evolutionary computing technique (e.g., a genetic algorithm, genetic program, etc.) is executed. Through the use of an appropriate fitness function, the evolutionary computing technique is applied to the dataset to generate a process change detection algorithm, such as a process state function or set of scaling coefficients. This algorithm can then be applied to future datasets (either in real-time during processing or after the process) to detect a process change.

The dataset can consist of any or all data channels, such as residual gas analysis data, laser reflectance data, optical emission spectra data, pressure, match network positions, DC voltages, etc. The process change detection algorithm can consist of a process state function and/or appropriate scaling coefficients. The process state function can be user selected or generated by the evolutionary computing technique. The process change to be detected can include transitions in substrate material composition. The evolutionary computing technique can employ a population size of about two or more times the number of process variables. As part of the process change detection algorithm, a process state function can be applied to an incoming process measurable. In addition, a filter can be applied to the results of the process state function. The process state function can be a sum over all scaled elements in a dataset, although more complex state functions can be generated.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE INVENTION

We disclose a means of generating directly optimized process state functions for the detection of process changes through the use of an evolutionary computing technique using an algorithm such as a genetic algorithm.

In biology, it is a generally accepted principle that in response to competitive pressures, organisms become more adapted to their environment through the process of evolution. Those organisms that successfully reproduce are judged "fit" for that environment. Those organisms that fail to reproduce can be thought of as "unfit" for that environment. As there are often many potential solutions to a problem, there may be several genetic traits that enabled the parents to reproduce. Through combination of their respective genetic traits, it is likely reasonable that some combinations of "fit" parents will produce offspring that may be potentially even more "fit" which is also referred to herein as a fitness function. It is also a possibility that a random mutation will occur during reproduction that will give the child a competitive advantage unavailable to either parent. Given these facts, it is statistically likely that each successive generation of organisms exposed to the same environment will on average become more successful at reproducing than the previous generation. Through evolution, organisms are optimized to their environment without the need for direction or any specific knowledge of what an optimal organism should be.

Figure 3:
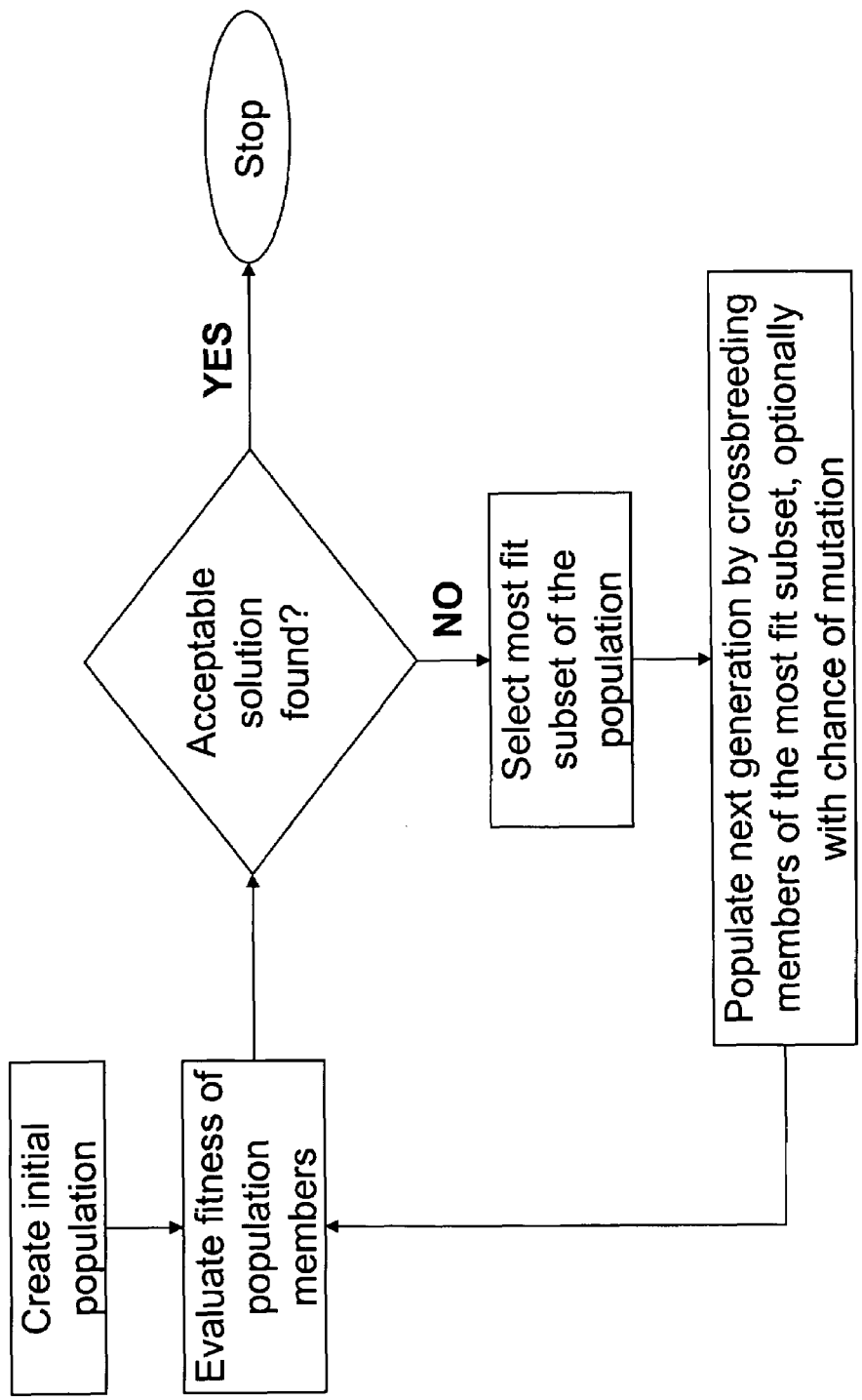
FIG. 3 is a flowchart of a genetic algorithm.

Evolutionary computing techniques are those computing techniques which attempt to replicate, at least in part, some of the processes involved in evolution. These techniques have become a powerful tool for optimization that is capable of being applied to a wide variety of problems that involve both continuous and discrete components. One specific type of evolutionary computing technique is known as a genetic algorithm (FIG. 3). This technique represents solutions as chromosomes that are evolved to achieve a desired goal.

In one embodiment of the present invention, a genetic algorithm is employed to generate process state functions that are optimized for the detection of process changes. At least one dataset is generated that contains at least one known process change. A random population of process state functions (and/or scaling coefficients) is also generated. Each member of the population is applied to at least one known dataset and evaluated using a fitness function that quantifies that population member's ability to detect at least one known process change. A set of the most successful population members is then recombined to create a new population. This new population is then tested, and is in turn reduced and recombined to generate yet another population. The process can be terminated after a set number of iterations, or when at least one population member demonstrates sufficient capability to meet the user's requirements.

It should be noted that the details of implementation of an evolutionary computing technique (and in fact, the specific evolutionary computing technique employed) depend on the application. Alternate methods of evaluating the fitness of the population, selection of population members for recombination, recombination techniques, the use of mutation operations, size of the population, etc., do not significantly deviate from the present invention.

It should also be noted that the present invention can be used to optimize aspects of process change detection beyond process state functions and scaling coefficients. Filter coefficients, peak detection techniques, and nearly any other process change detection parameter could be included in the population, and thereby optimized with this technique.

Endpoint Detection Example

In this example, an optimized set of scaling coefficients was generated using a genetic algorithm for the purposes of detecting a plasma process endpoint on a binary chrome photomask.

Figure 1:
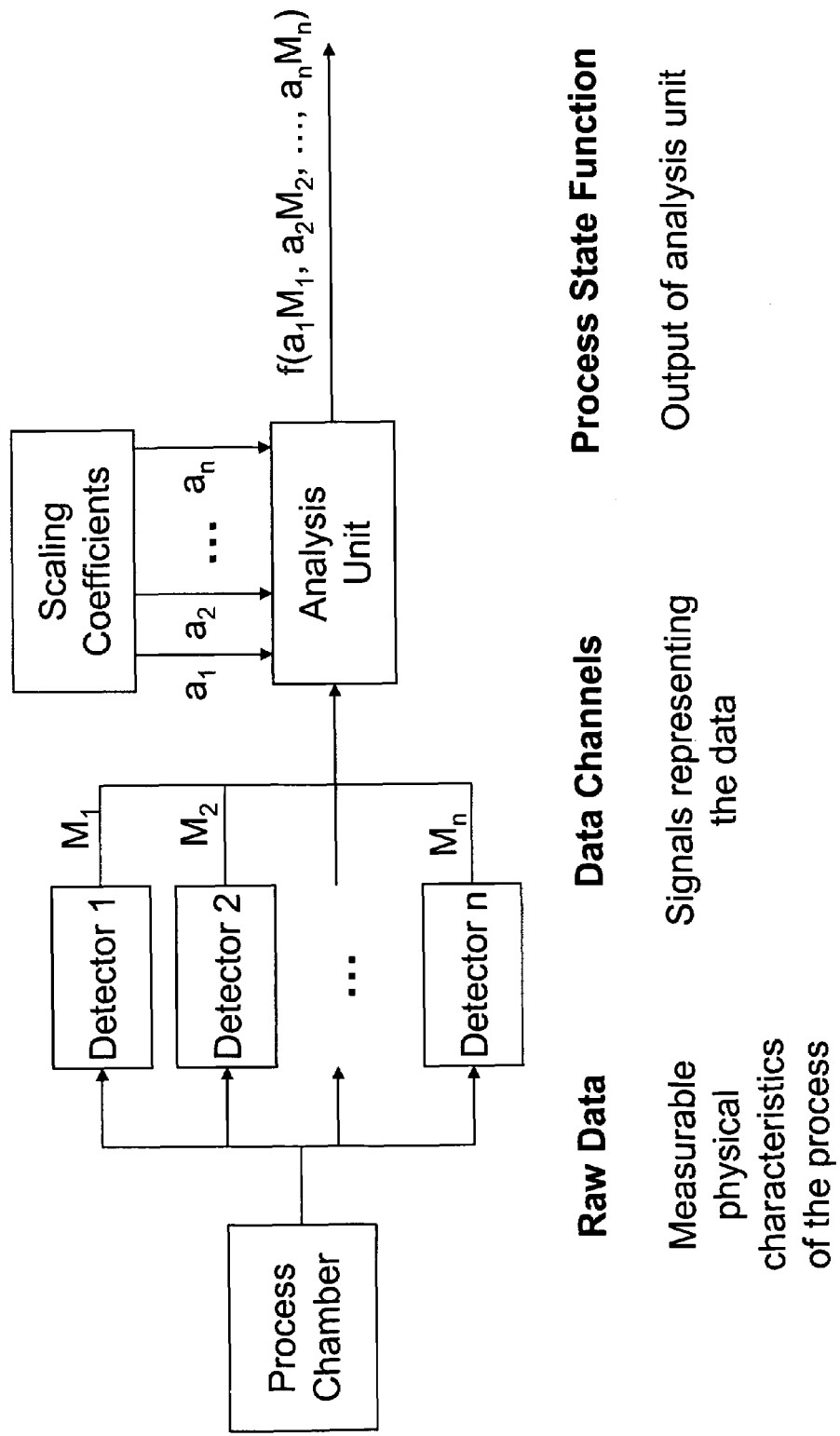
FIG. 1 is a schematic of a generic process change detection system described in terms of a process state function.
Figure 2:
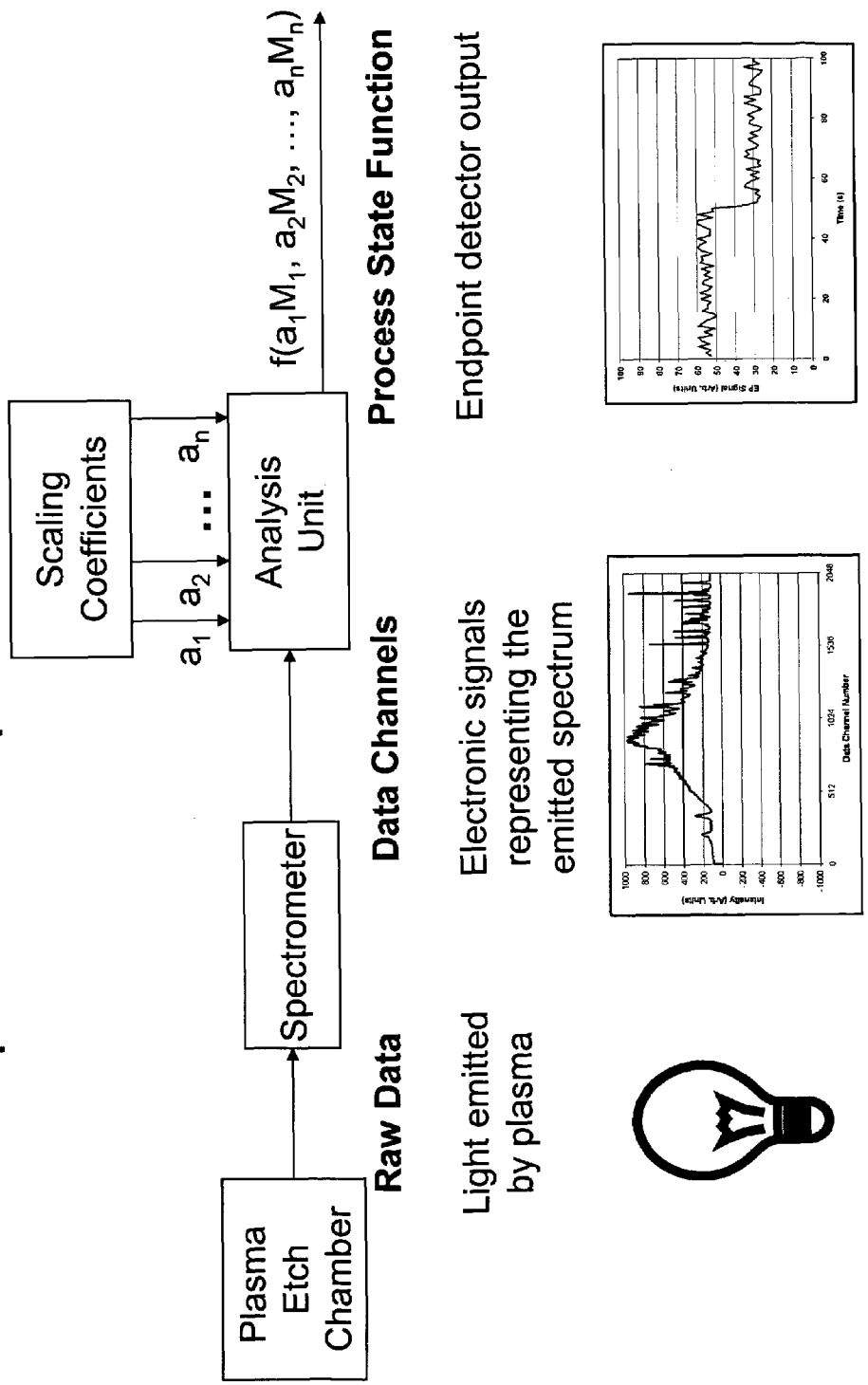
FIG. 2 is a schematic of a typical OES endpoint detection system.

An optical emission spectroscopy (OES) based endpoint system (identical to the one described in FIG. 2) was used to collect plasma emissions and separate them into the component wavelengths. Individual wavelengths were each represented by a data channel $M_n$, with a total of 2048 separate data channels produced. A generic process state function was defined as the sum of the products of the intensity at each wavelength and a unique scaling coefficient an (ranging in value from −1 to 1) for each wavelength:

$$\text{Process State Function} = a_1 * M_1 + a_2 * M_2 + \ldots + a_n * M_n$$

Figure 4:
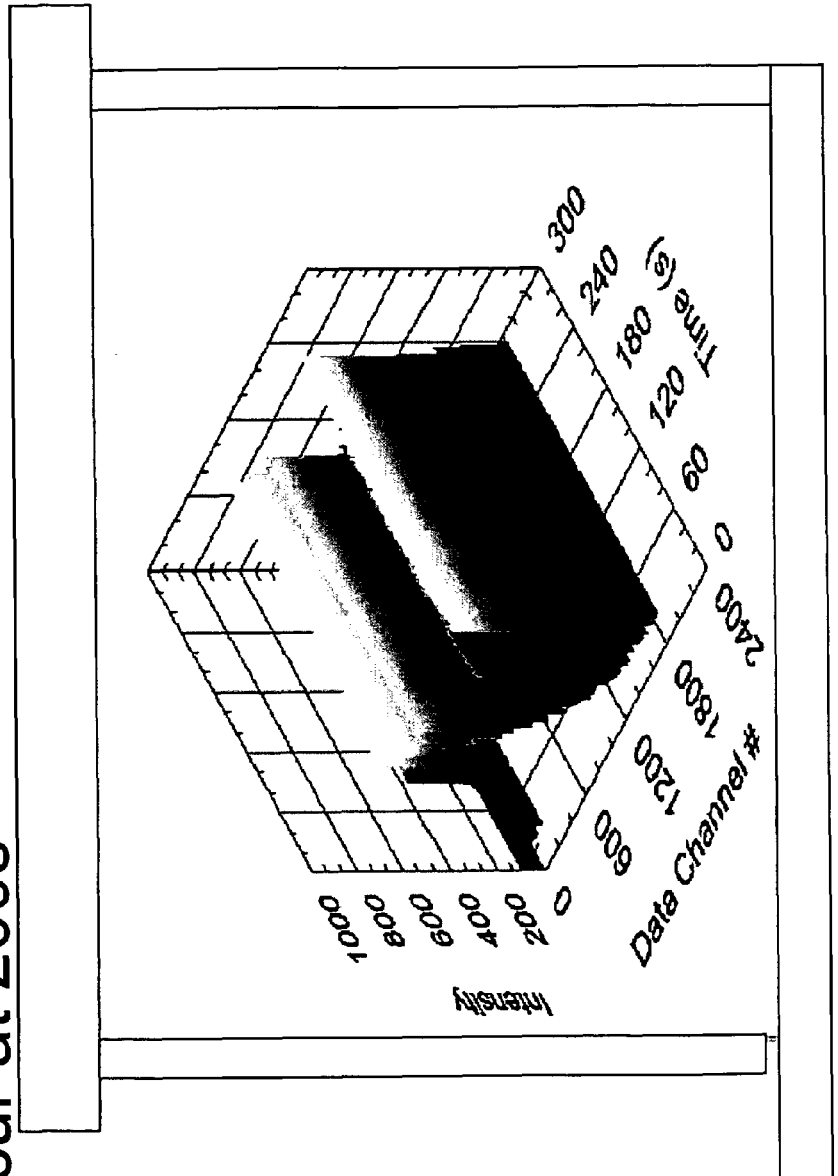
FIG. 4 is a graph of data channel vs. intensity showing process endpoint to occur at 200 seconds.
Figure 5:
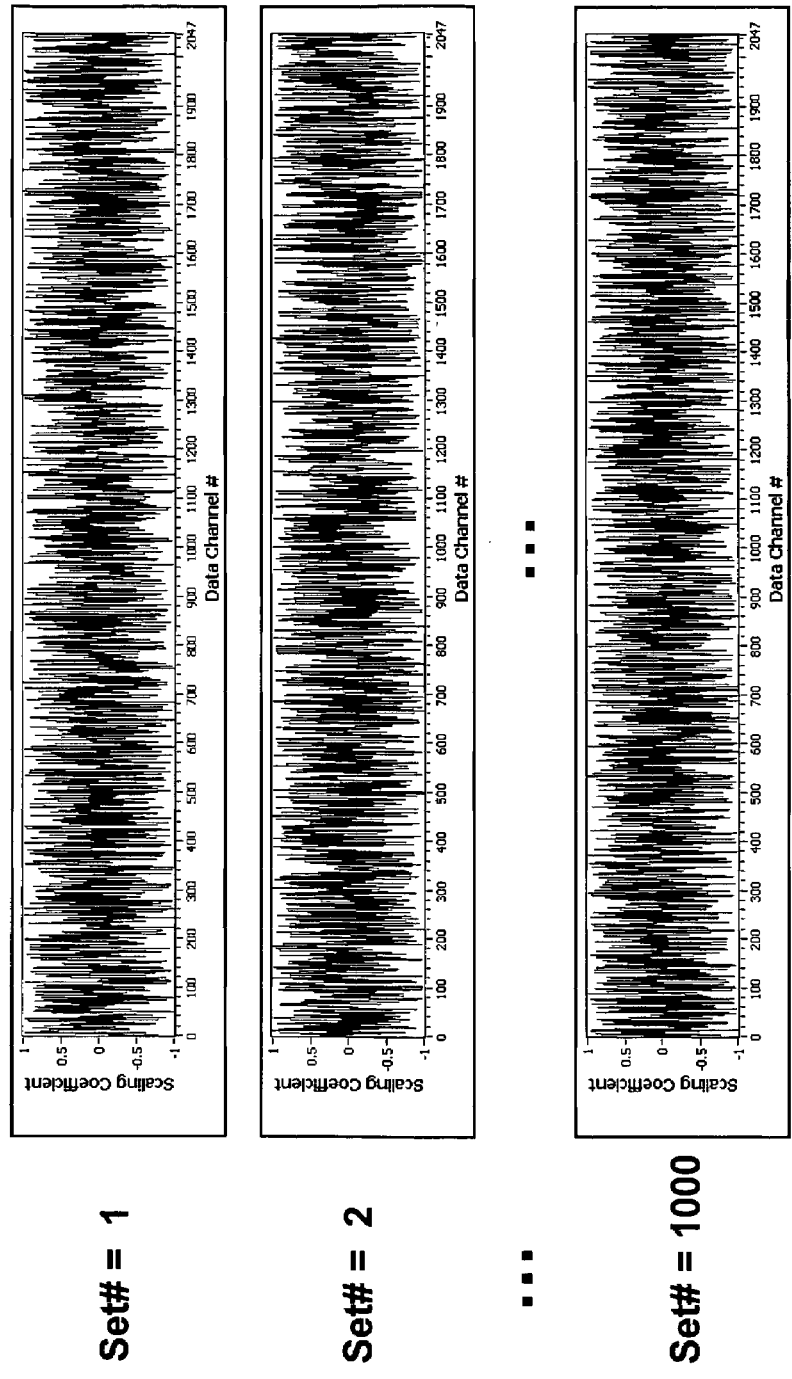
FIG. 5 shows graphs of populations of data channels vs. scaling coefficients.
Figure 6:
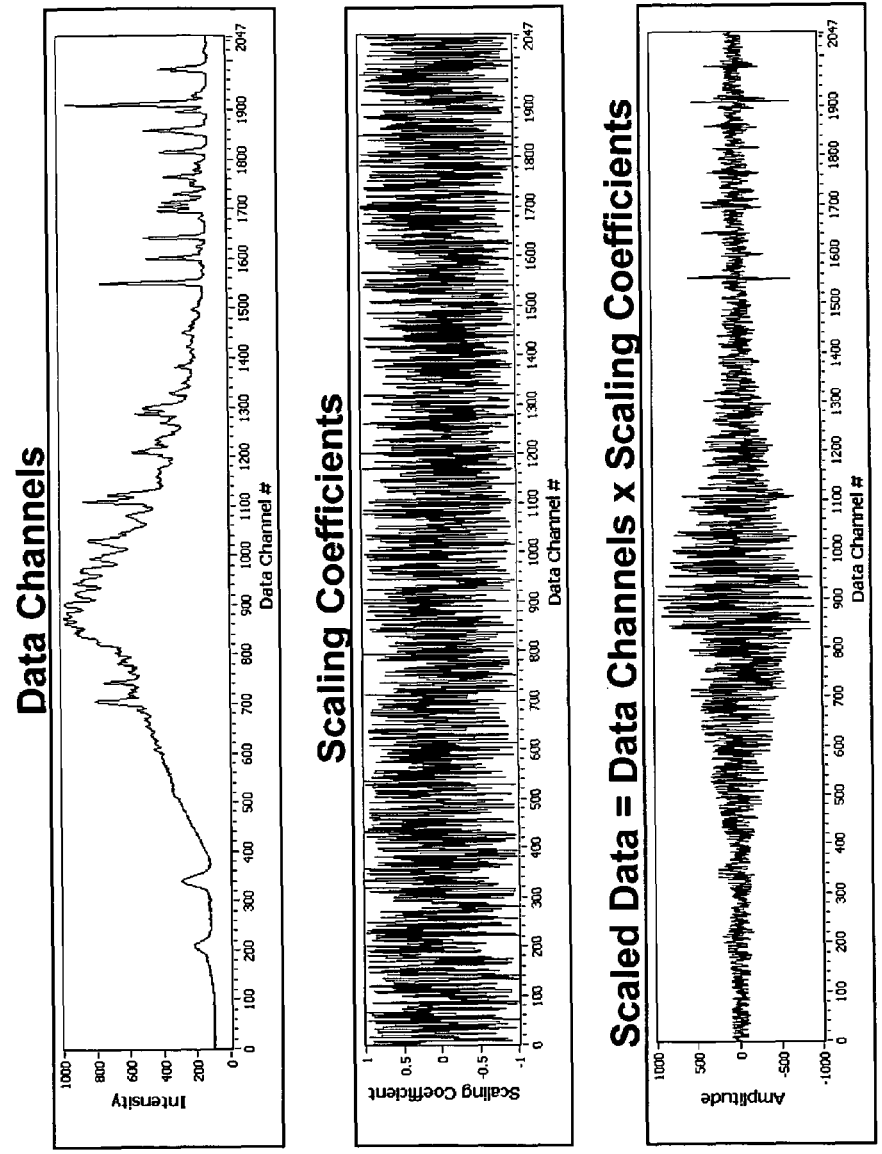
FIG. 6 is a graph of the data from FIG. 5 using scaling coefficients.
Figure 7:
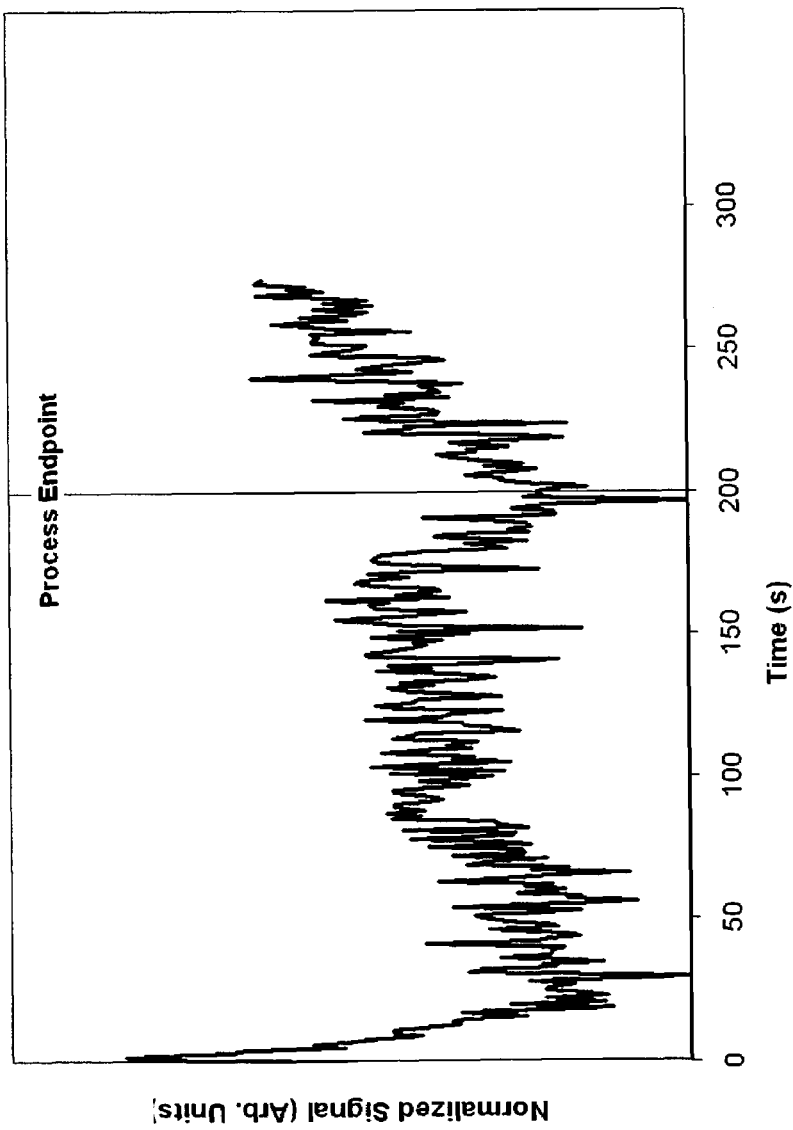
FIG. 7 is a graph of the scaled coefficients of FIG. 6 applied to the process state function to generate an endpoint signal.
Figure 8:
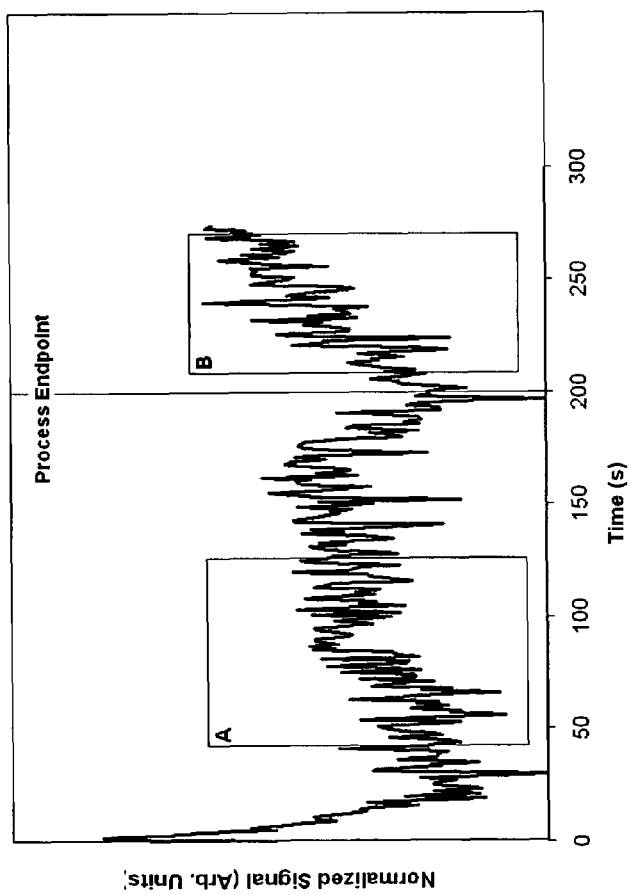
FIG. 8 is a graph of the generated endpoint signal of FIG. 7 evaluation the signal to noise ratio.
Figure 9:
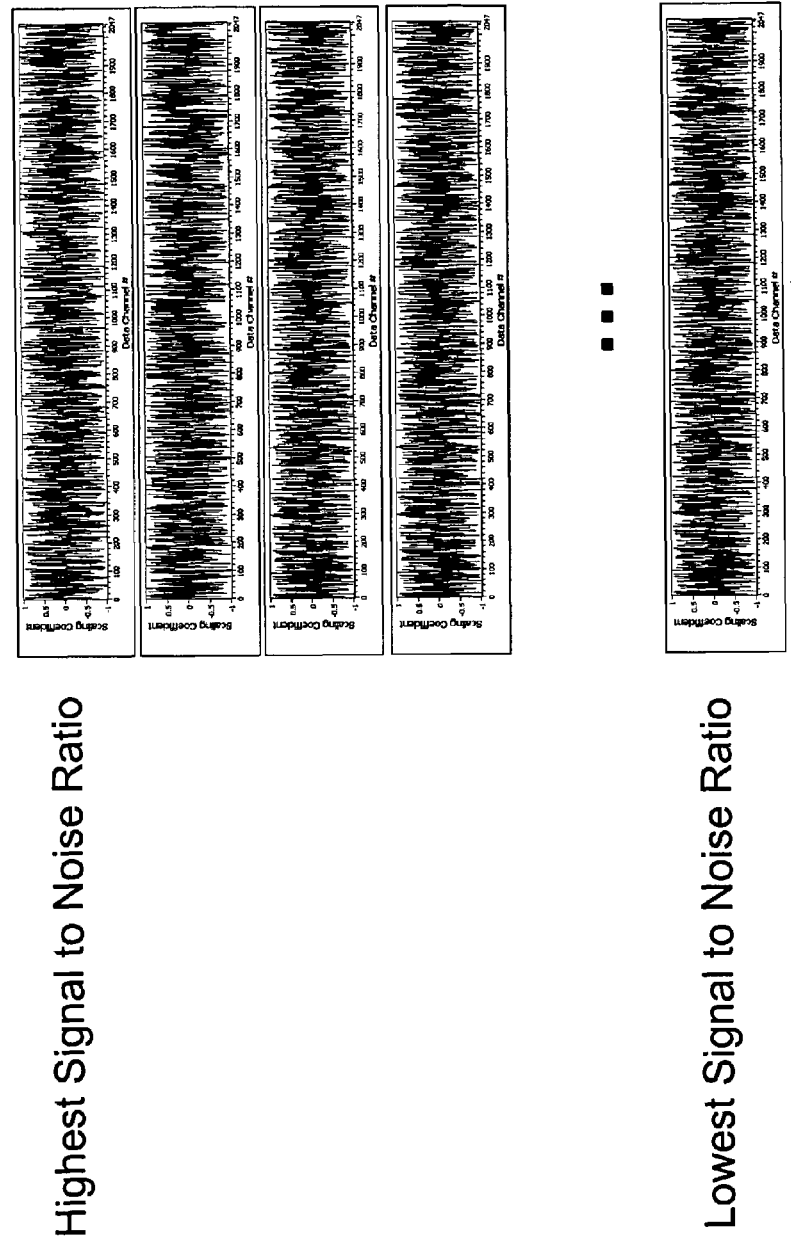
FIG. 9 is a ranking of the scaling coefficient sets from highest signal to noise ration to lowest signal to noise ratio.
Figure 10:
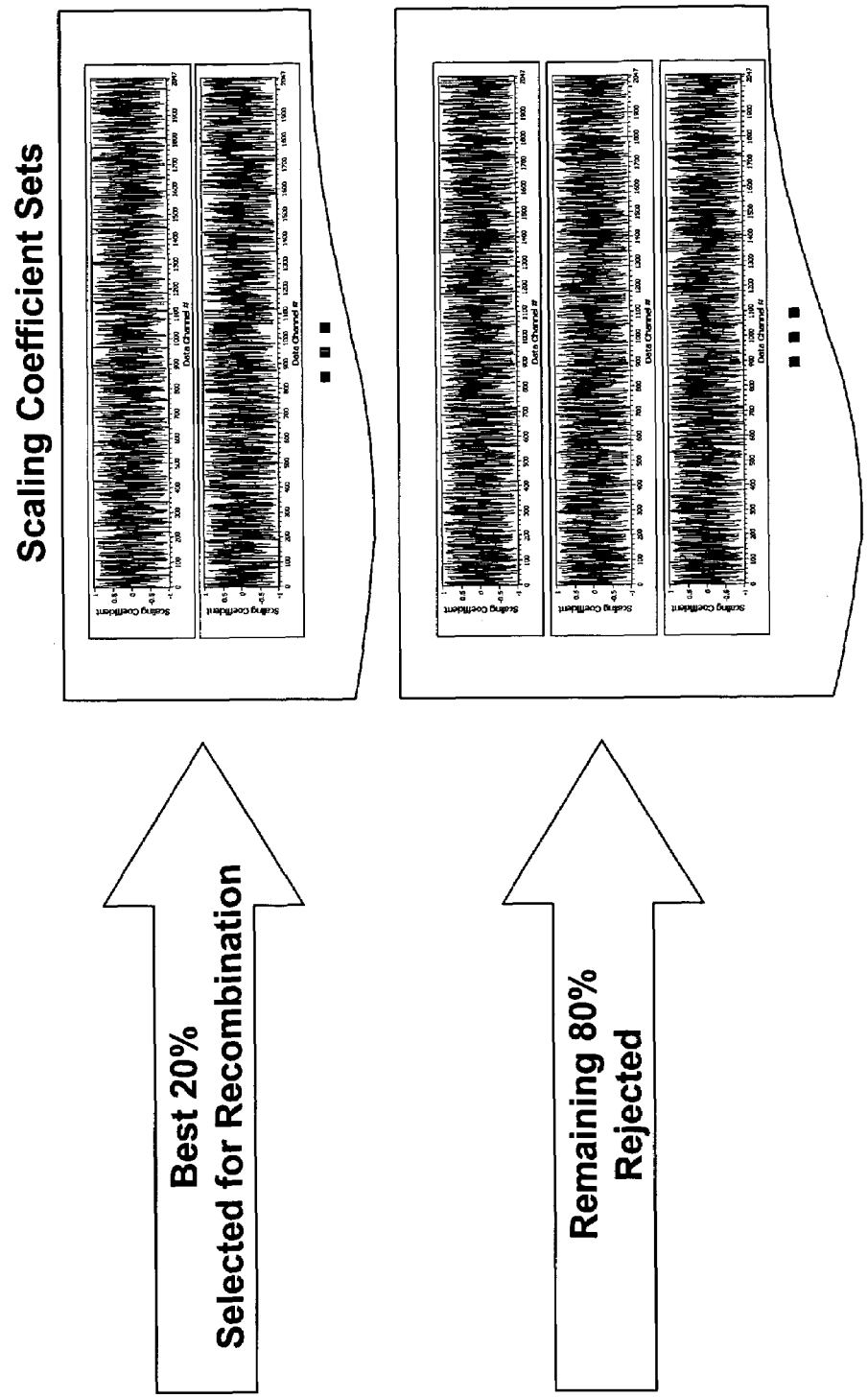
FIG. 10 shows a selection of the best 20% of the scaling coefficient sets.

A test dataset was generated in which a known process change (endpoint) occurred at 200 seconds (FIG. 4). A 1000 member population consisting of sets of 2048 scaling coefficients were generated (FIG. 5). Each set of coefficients was multiplied by the spectrometer data to create scaled spectra (FIG. 6). The scaled spectra were applied to the process state function to generate an endpoint signal (FIG. 7). The fitness function—in this case, the Signal to Noise Ratio (SNR) for the generated endpoint signal—was evaluated for each coefficient set (FIG. 8). At this point, the coefficient sets were ranked according to SNR. Then, 20% of coefficient sets with the highest SNR were selected for recombination. The remaining 80% of coefficient sets were eliminated from further consideration (FIGS. 9 and 10).

Figure 11:
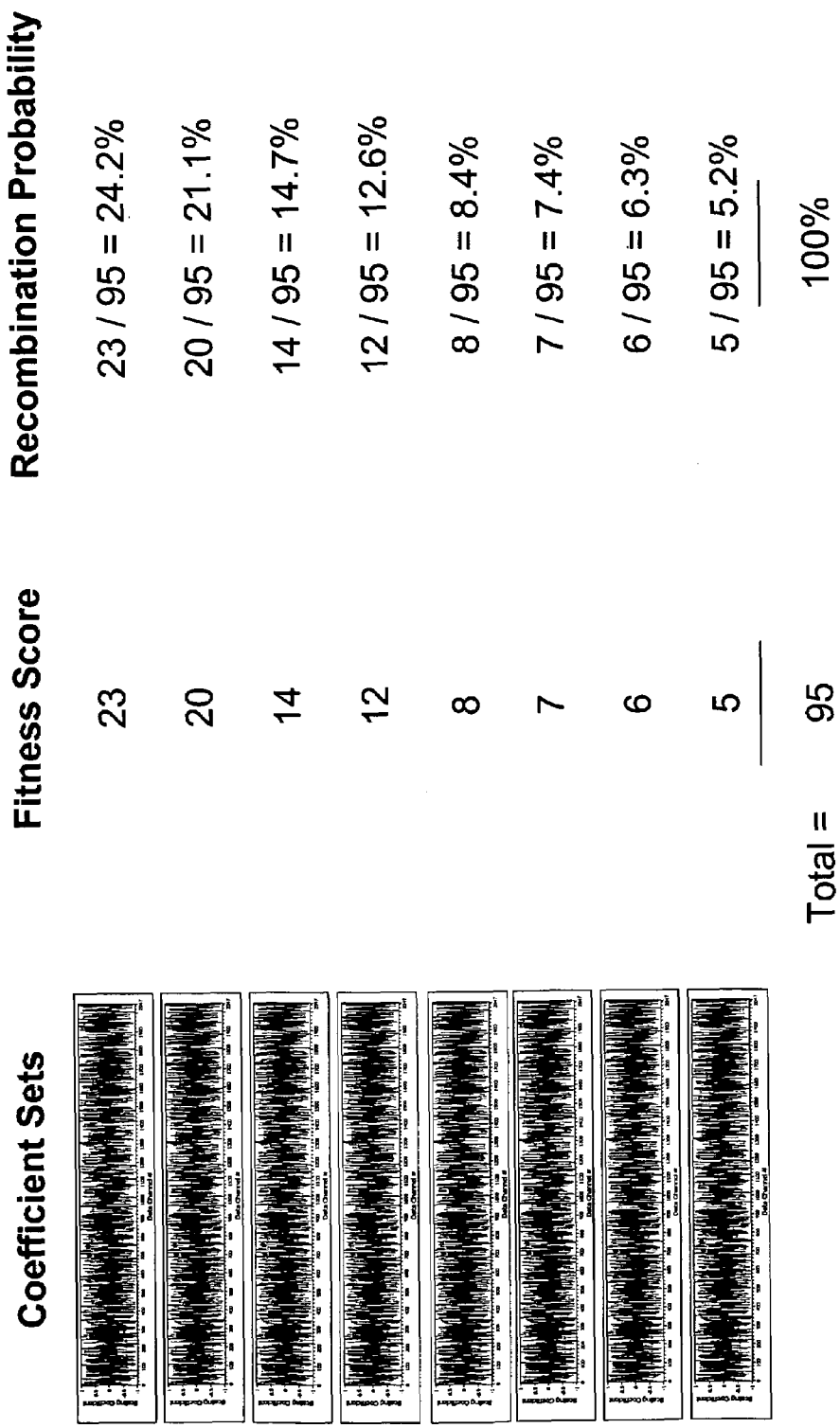
FIG. 11 shows an assignment of recombination probability for the coefficient sets.

Out of the 20% selected for recombination, each coefficient set was assigned a recombination probability based on its relative fitness compared to the other surviving coefficient sets. FIG. 11 gives an example in which several ranked sets are assigned a recombination probability. Random selection of pairs of coefficient sets for recombination was then performed to create a new 1000 member population. Note that the population size and percentage of sets selected for recombination or elimination is somewhat arbitrary, and can be selected based on the user's needs.

When each pair of coefficient sets were selected for recombination, each of the coefficient sets (called Parent A and Parent B, respectively) were split into two smaller sections at the same randomly selected breakpoint. One section from Parent A (called A1) consisted of the coefficients located before the split point while the other section (called A2) would contain all the coefficients located after the split point. A random selection of A1 or A2 was performed. Whichever section was selected, it was then concatenated with the opposing section from parent B. For example, if A1 was retained, then it was combined with B2 to produce the new coefficient set "A1B2." If A2 was retained, then it was combined with B1 to produce the new coefficient set "B1A2."

Figure 12:
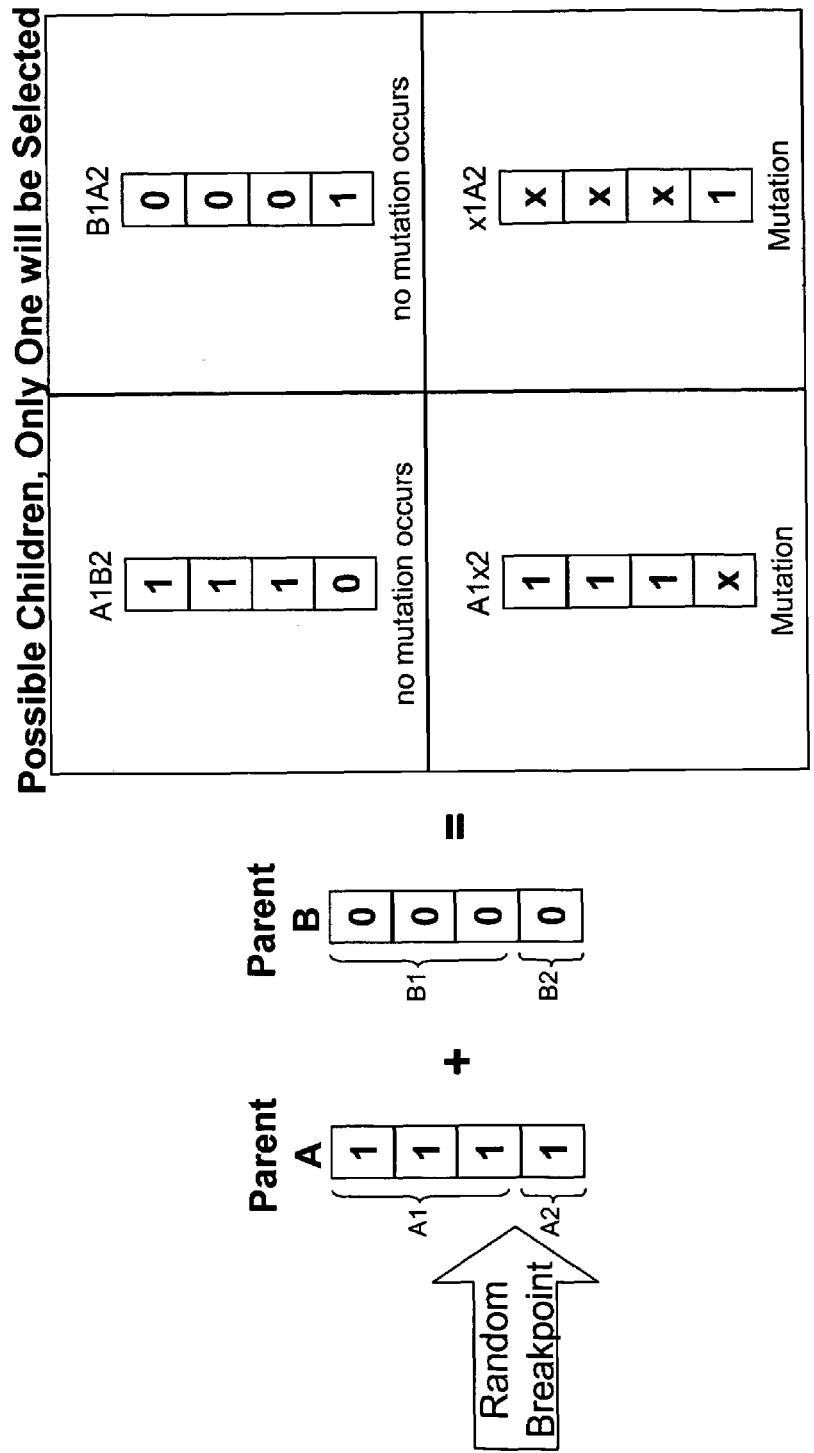
FIG. 12 shows an example of the recombination process.

When recombination of the pairs occurs, there was also a small chance (15% in our experiments) that a new randomly generated coefficient set could be substituted for one of the parents. This method was used to simulate the process of mutation. It is known in the art that the use of mutation operations can result in a more optimal solution than could be obtained otherwise. FIG. 12 illustrates the recombination process with a simplified example.

Figure 13:
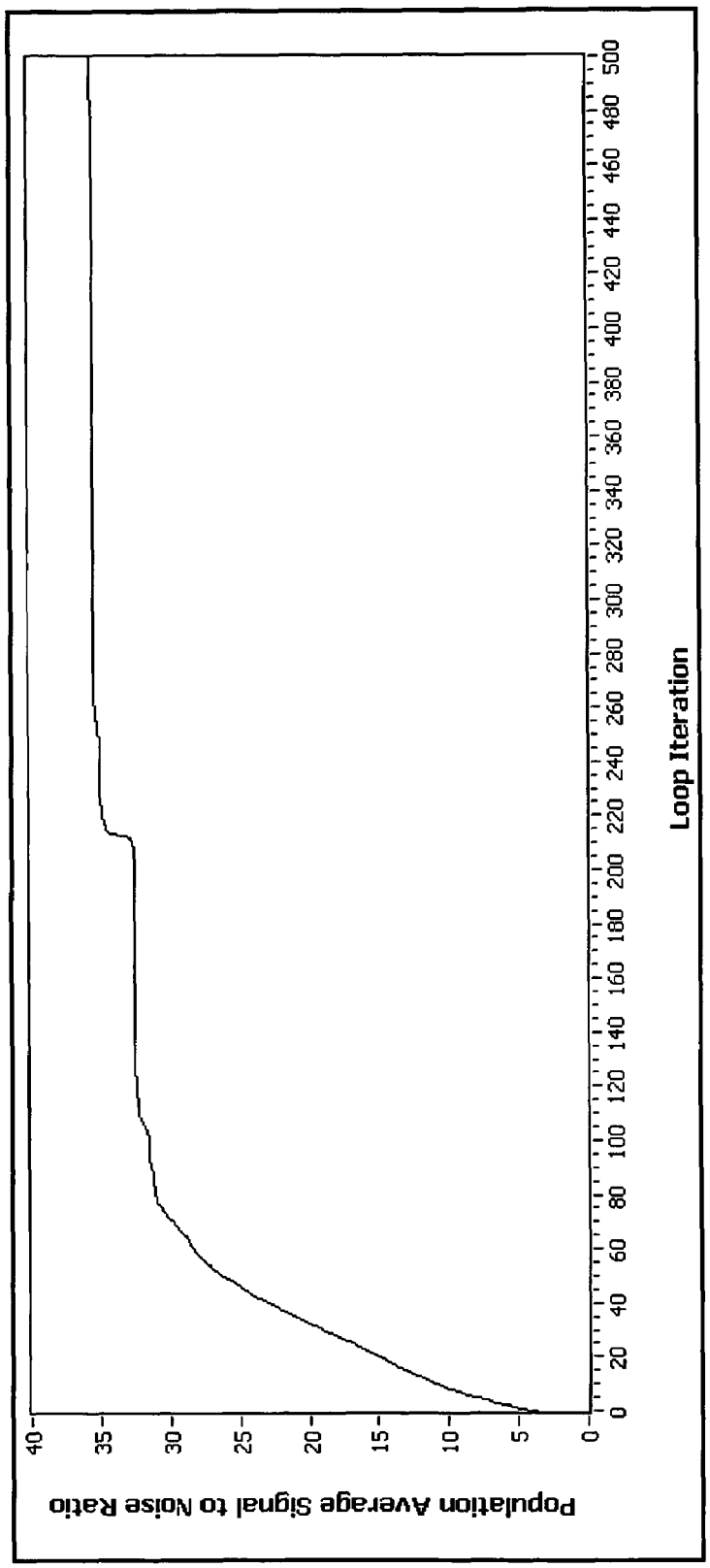
FIG. 13 shows a graphical example of genetic optimization for average signal to noise ratio to algorithm loop iteration

Once a second generation had been created through recombination and mutation of the most successful coefficient sets from the first generation, the first generation was discarded. Measurements of the average SNR produced by the second generation population showed that the second generation was in fact superior to the first generation. The second generation was then applied to the same process of testing and recombination, resulting in a third generation. Again, the third generation possessed a higher signal to noise ratio. Continuously applying this algorithm, it was eventually possible to generate coefficient sets with very high signal to noise ratios compared to the initial, unoptimized scaling coefficient sets. FIG. 13 shows a plot of the average SNR vs. the algorithm loop iteration.

Figure 14:
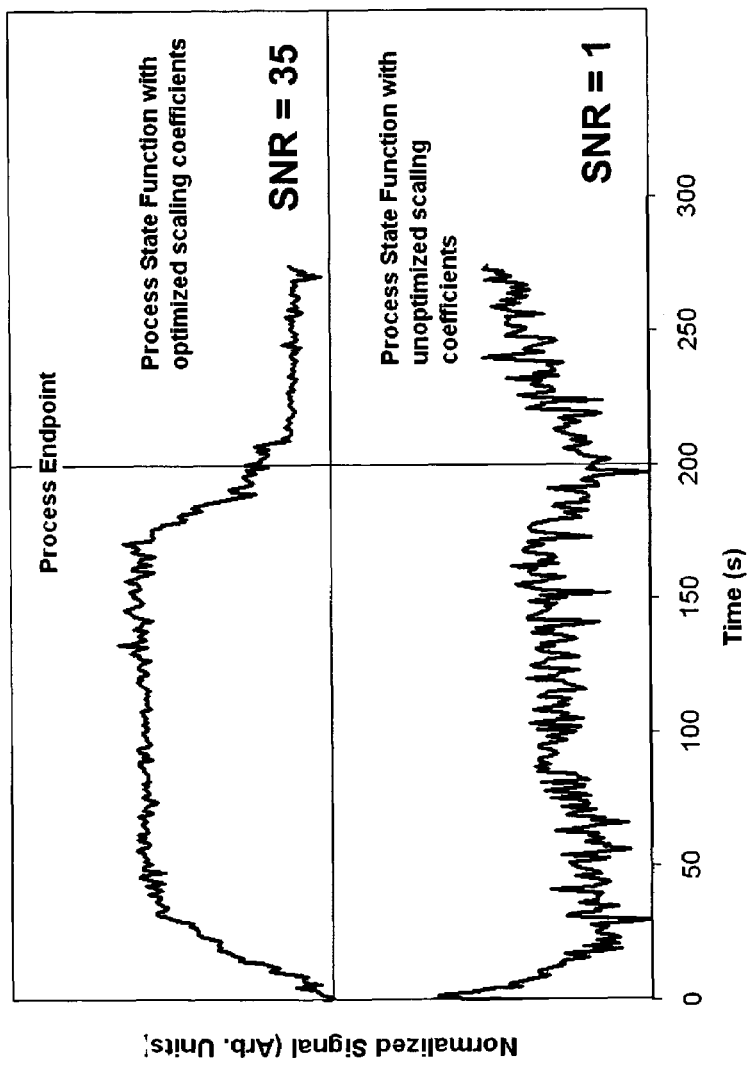
FIG. 14 is a graph of the normalized signal over time for an optimized process state function.

Eventually, the algorithm reached a point at which there was no further significant improvement in SNR. The best set of scaling coefficients produced was then multiplied with the data and inserted into the process state function. The resulting endpoint signal had a signal to noise measured at 35:1, easily sufficient for endpoint detection (FIG. 14).

Figure 15:
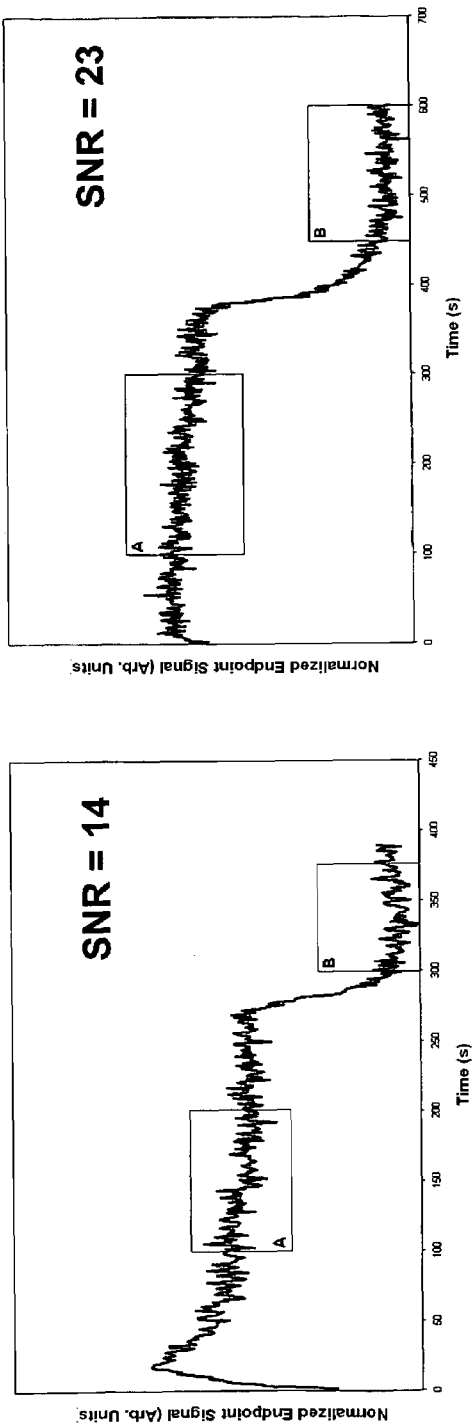
FIG. 15 is a graph of the normalized signal over time for optimized coefficients applied to other datasets.

To test whether the solution produced by the genetic algorithm was general or specific to the dataset used in the optimization, the coefficient set was applied to other datasets (FIG. 15). These datasets were taken during similar etches of binary chrome masks with slightly different etch process parameters and chrome loadings. While performance was degraded relative to the results obtained on the optimization dataset, the performance indicates that the genetic algorithm solution is general in nature, and not limited to the optimization dataset.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for improving the detection of a process change, the method comprising:
   placing a substrate in a chamber;
   exposing the substrate to a process with at least one known process change;
   acquiring at least one dataset during a process;
   generating a first random population of process state functions;
   applying at least one dataset to each member of the first generated population;
   evaluating the ability of each member of the first generated population to detect at least one known process change;
   recombining the most successful members of the first generated population to generate a second population;
   applying at least one dataset to each member of the second generated population; and
   evaluating the ability of each member of the second generated population to detect at least one known process change.

2. The method according to claim 1 wherein said process is a plasma etch process.

3. The method according to claim 1 wherein said substrate is a photomask.

4. The method according to claim 1 wherein said substrate is a semiconductor material.

5. The method according to claim 1 wherein said substrate is a dielectric material.

6. The method according to claim 1 wherein said substrate is an electrically conductive material.

7. The method according to claim 1 wherein said process change is a material transition in the substrate.

8. The method according to claim 1 wherein said dataset further comprising plasma emission spectra data.

9. The method according to claim 1 wherein said dataset further comprising residual gas analysis data.

10. The method according to claim 1 wherein said process state functions are a set of scaling coefficients.

11. The method according to claim 1 wherein said successful members are the top 20 percent of the population.

12. The method according to claim 11 wherein the remaining 80 percent of the population is eliminated from further consideration.

13. The method according to claim 1 further comprising a set number of generated populations.

14. The method according to claim 1 further comprising terminating the generation of populations when at least one member of a population meets a set criteria.

15. The method according to claim 1 wherein said dataset further comprising at least one plasma processing parameter.

16. The method according to claim 14 wherein said plasma processing parameter comprises measurements of the plasma condition, substrate condition, or processing apparatus condition.

* * * * *

UNITED STATES PATENT AND TRADEMARK OFFICE
CERTIFICATE OF CORRECTION

PATENT NO.       : 7,625,824 B2
APPLICATION NO.  : 11/441811
DATED            : December 1, 2009
INVENTOR(S)      : Jason Plumhoff It is certified that error appears in the above-identified patent and that said Letters Patent is hereby corrected as shown below:

Column 6 Line 17 - "...wavelength and a unique scaling coefficient ~~an~~ $\underline{a_n}$..."

Column 8 Line 42 - "16. The method according to ~~14~~ $\underline{15}$ wherein said plasma..."

Signed and Sealed this

Twelfth Day of January, 2010

David J. Kappos
*Director of the United States Patent and Trademark Office*